US012694003B2

(12) United States Patent
Wang et al.

(10) Patent No.: US 12,694,003 B2
(45) Date of Patent: Jul. 28, 2026

(54) DEDUPLICATION OF QUERY TO ASSORTMENT PAGES

(71) Applicant: Walmart Apollo, LLC, Bentonville, AR (US)

(72) Inventors: Zigeng Wang, Cupertino, CA (US); Cheng Jie, Sunnyvale, CA (US); Wei Shen, Pleasanton, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1096 days.

(21) Appl. No.: 17/588,247

(22) Filed: Jan. 29, 2022

(65) Prior Publication Data

US 2023/0244645 A1     Aug. 3, 2023

(51) Int. Cl.
G06F 16/958     (2019.01)
G06F 16/215     (2019.01)
(Continued)

(52) U.S. Cl.
CPC ........... *G06F 16/215* (2019.01); *G06N 3/048* (2023.01)

(58) Field of Classification Search
None
See application file for complete search history.

(56) References Cited

U.S. PATENT DOCUMENTS 9,798,820 B1 * 10/2017 Prémont-Schwarz ......................
                                     G06F 16/3347
11,301,540 B1 * 4/2022 Boteanu ................ G06F 40/279
(Continued)

FOREIGN PATENT DOCUMENTS

CN      106407195     2/2017
CN      112765940     5/2021

*Primary Examiner* — Nhat Huy T Nguyen
(74) *Attorney, Agent, or Firm* — FOLEY & LARDNER LLP

(57)                ABSTRACT

A method including generating, using a semantic embedding generation machine learning model, one or more respective shelf embedding vector representations for each of one or more browse shelves based on a respective shelf name for the each of the one or more browse shelves. The method also can include obtaining a keyword. The method additionally can include generating, using the semantic embedding generation machine learning model, a keyword embedding vector representation based on the keyword. The method further can include determining a respective similarity score between the keyword embedding vector representation and each of the one or more respective shelf embedding vector representations for each of the one or more browse shelves. The method additionally can include determining whether any of the respective similarity scores for the one or more respective shelf embedding vector representations across the one or more browse shelves exceed a predetermined threshold value. When any of the respective similarity scores for the one or more respective shelf embedding vector representations across the one or more browse shelves exceeds a predetermined threshold value, the method further can include filtering out the keyword. When none of the respective similarity scores for the one or more respective shelf embedding vector representations across the one or more browse shelves exceed a predetermined threshold value, the method additionally can include generating a new topic page using the keyword. Other embodiments are described.

20 Claims, 7 Drawing Sheets

(51) Int. Cl.
    G06N 3/0455     (2023.01)
    G06N 3/048     (2023.01)
    G06N 3/084     (2023.01)

(56)           References Cited

U.S. PATENT DOCUMENTS

| 2003/0065502 A1* | 4/2003 | Zhu | G06F 16/355 |
| | | | 704/4 |
| 2005/0120006 A1* | 6/2005 | Nye | G06F 16/954 |
| 2008/0263026 A1 | 10/2008 | Sasturkar et al. | |
| 2021/0304121 A1 | 9/2021 | Lee et al. | |
| 2022/0101113 A1* | 3/2022 | Tam | G06N 3/045 |

* cited by examiner

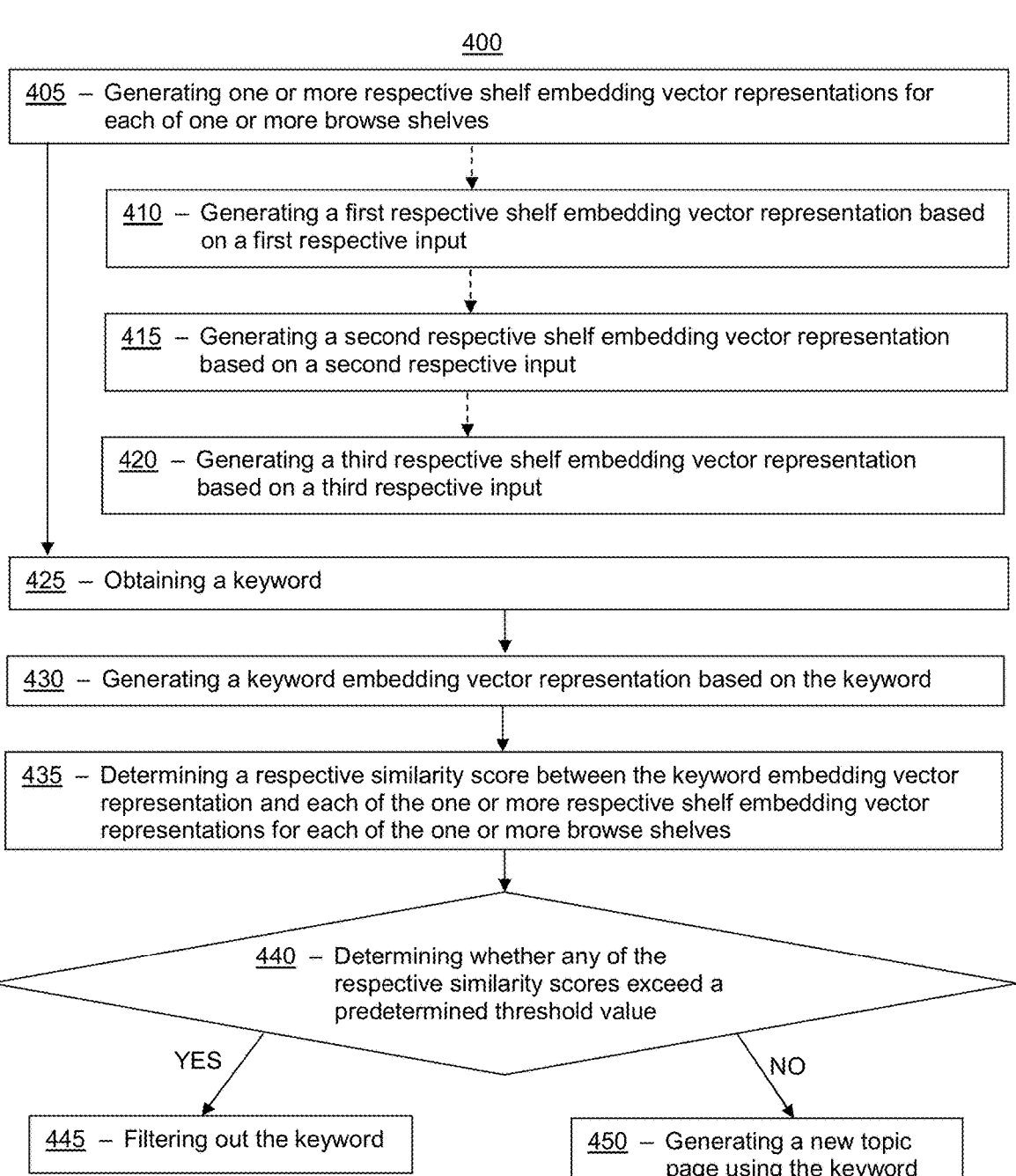

400

405 — Generating one or more respective shelf embedding vector representations for each of one or more browse shelves 410 — Generating a first respective shelf embedding vector representation based on a first respective input 415 — Generating a second respective shelf embedding vector representation based on a second respective input 420 — Generating a third respective shelf embedding vector representation based on a third respective input 425 — Obtaining a keyword 430 — Generating a keyword embedding vector representation based on the keyword 435 — Determining a respective similarity score between the keyword embedding vector representation and each of the one or more respective shelf embedding vector representations for each of the one or more browse shelves 440 — Determining whether any of the respective similarity scores exceed a predetermined threshold value

YES

NO

445 — Filtering out the keyword

450 — Generating a new topic page using the keyword

FIG. 4

Legend:

Query's scope

Browse shelf page's scope

DEDUPLICATION OF QUERY TO ASSORTMENT PAGES

TECHNICAL FIELD

This disclosure relates generally to deduplication of query to assortment pages.

BACKGROUND

Websites that offer items online can present those items through various types of pages, such as browse pages based on categorical taxonomy of the items, search result pages generated based on keyword searches from users, and/or topic pages based on keywords that are pre-generated. Third-party search engines can crawl various types of pages on such websites but not others. For example, search result pages are typically generated based on user searches, and are not crawled by third-party search engines. Generating new topic pages can result in overlaps with existing browse pages.

BRIEF DESCRIPTION OF THE DRAWINGS

To facilitate further description of the embodiments, the following drawings are provided in which:

FIG. 4 illustrates a flow chart for a method of providing deduplication of query to assortment pages, according to an embodiment;

Figure 1:
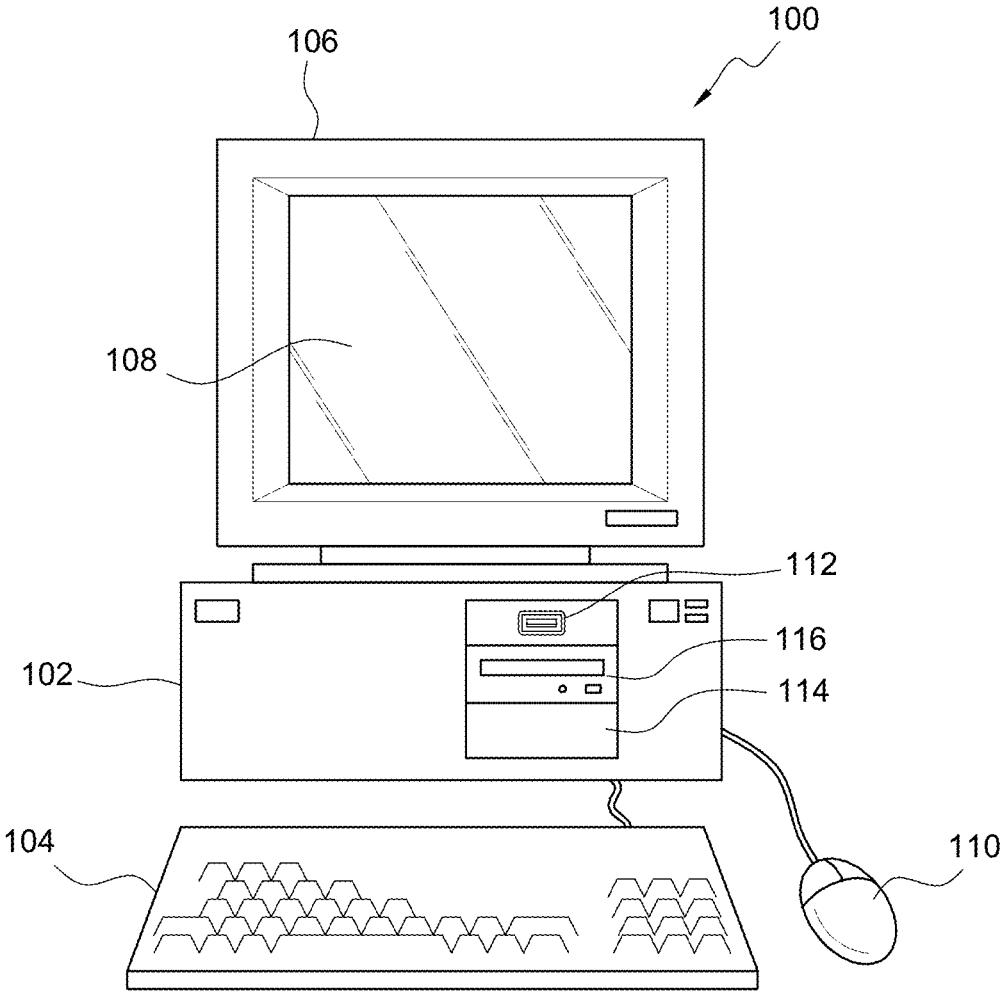
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds.

DESCRIPTION OF EXAMPLES OF EMBODIMENTS

Figure 2:
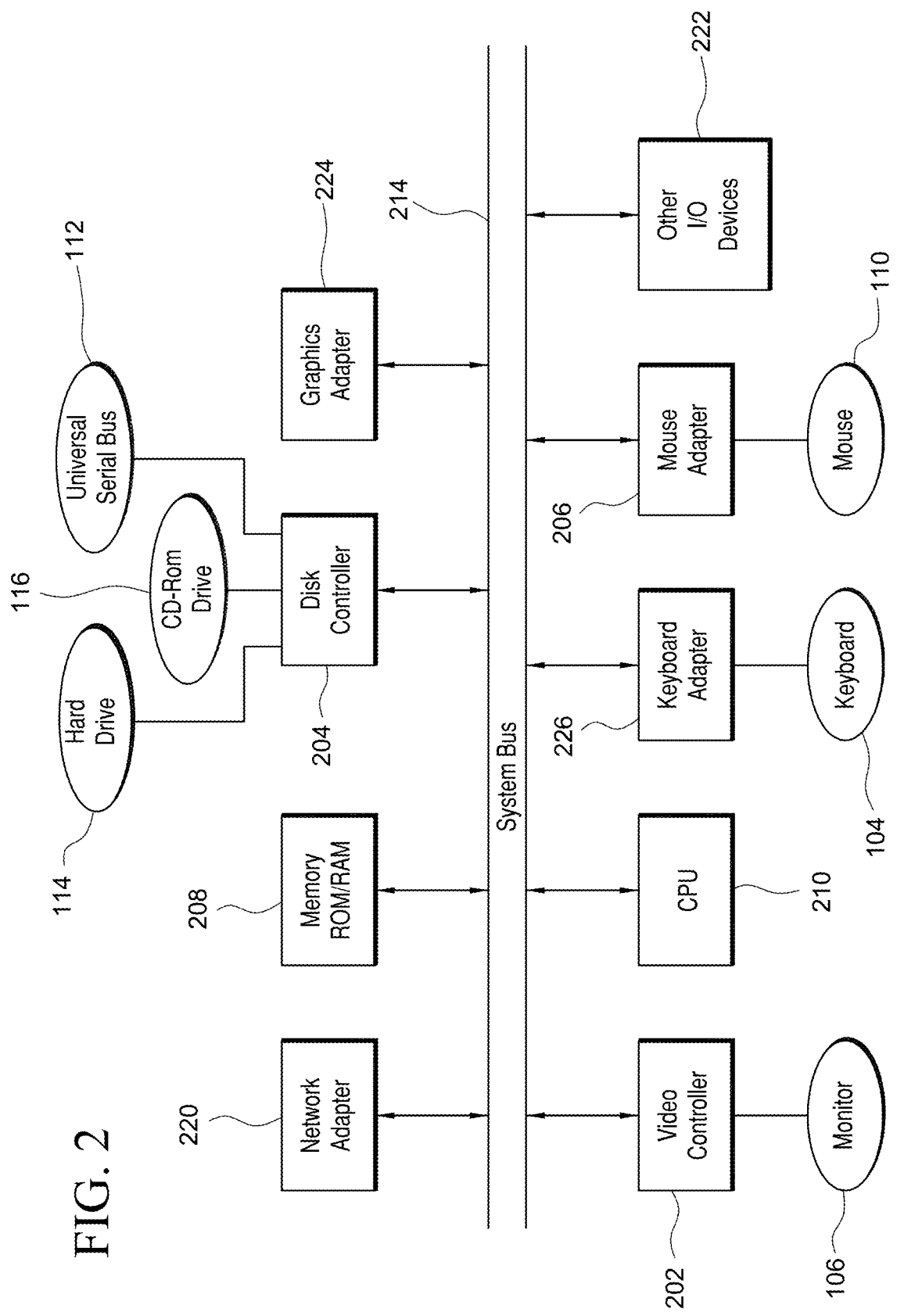
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
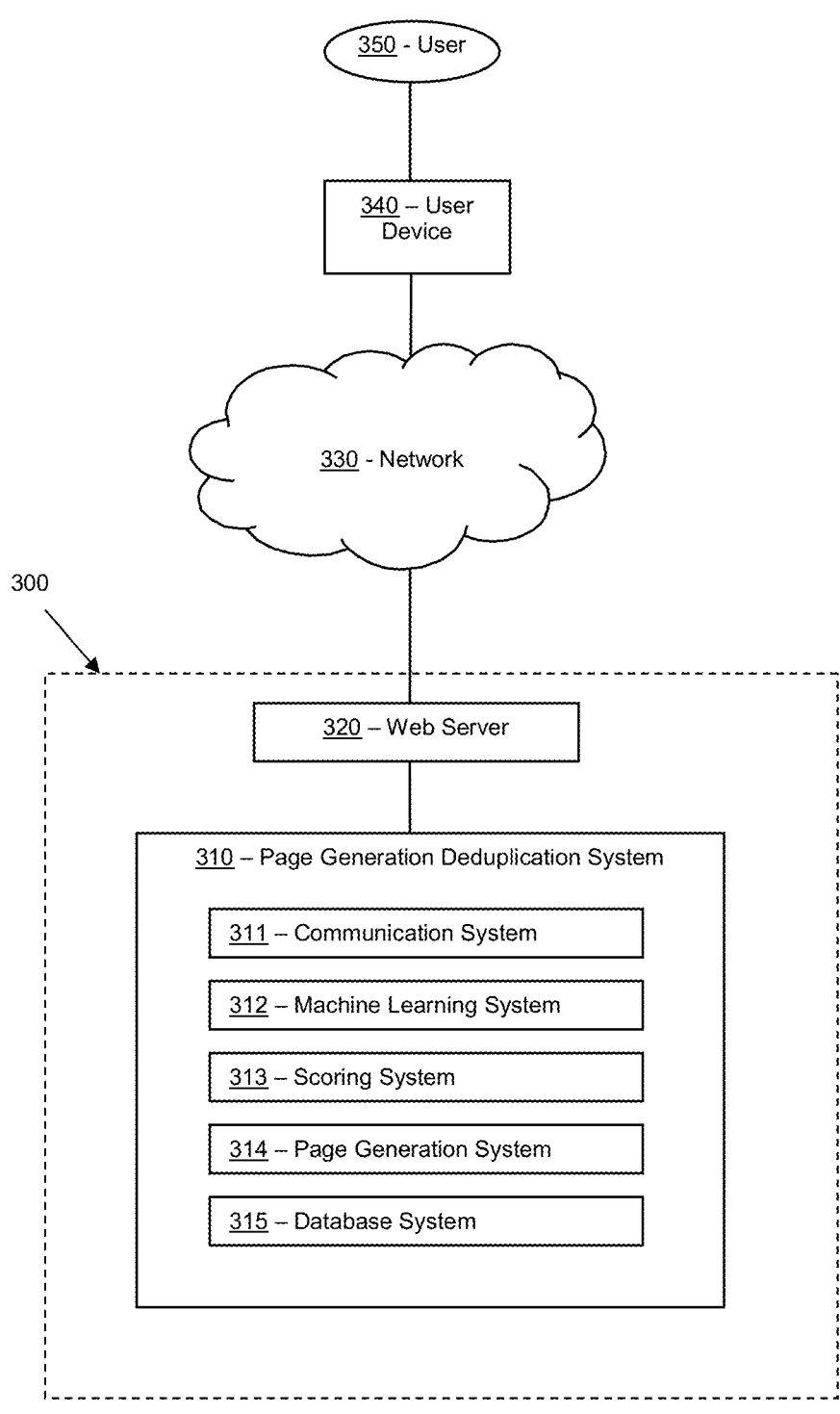
FIG. 3 illustrates a block diagram of a system that can be employed for deduplication of query to assortment pages, according to an embodiment.

Turning ahead in the drawings, FIG. 3 illustrates a block diagram of a system 300 that can be employed for deduplication of query to assortment pages, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a page generation deduplication system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Page generation deduplication system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host page generation deduplication system 310 and/or web server 320. Additional details regarding page generation deduplication system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a web site, or provide a server that interfaces with an application (e.g., a mobile application), on user device 340, which can allow users (e.g., 350) to browse and/or search for items (e.g., products, grocery items), to add items to an electronic cart, and/or to purchase items, in addition to other suitable activities. In a number of embodiments, web server 320 can interface with page generation deduplication system 310 to obtain new topic pages.

In some embodiments, an internal network that is not open to the public can be used for communications between page generation deduplication system 310 and web server 320 within system 300. Accordingly, in some embodiments, page generation deduplication system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Lumia® or similar product by the Nokia Corporation of Keilaniemi, Espoo, Finland, and/or (iii) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Android™ operating system developed by the Open Handset Alliance, or (iii) the Windows Mobile™ operating system by Microsoft Corp. of Redmond, Washington, United States of America.

In many embodiments, page generation deduplication system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to page generation deduplication system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of page generation deduplication system 310 and/or web server 320. In a similar manner, the processors and/or the non-transitory computer-readable media can be local and/or remote to each other.

Meanwhile, in many embodiments, page generation deduplication system 310 and/or web server 320 also can be configured to communicate with one or more databases, such as a database system 315. The one or more databases can include a product database that contains information about products, items, or SKUs (stock keeping units), for example, among other information, such as browse shelves and vector representations of such browse shelves, topic pages, and/or other suitable information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, Postgr-eSQL Database, Microsoft SQL Server Database, Oracle Database, SAP (Systems, Applications, & Products) Database, and IBM DB2 Database.

Meanwhile, page generation deduplication system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, page generation deduplication system 310 can include a communication system 311, a machine learning system 312, a scoring system 313, a page generation system 314, and/or database system 315. In many embodiments, the systems of page generation deduplication system 310 can be modules of computing instructions (e.g., software modules) stored at non-transitory computer readable media that operate on one or more processors. In other embodiments, the systems of page generation deduplication system 310 can be implemented in hardware. Page generation deduplication system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host page generation deduplication system 310 and/or web server 320. Additional details regarding page generation deduplication system 310 and the components thereof are described herein.

In many embodiments, system 300 can generate new topic pages for a website of an ecommerce retailer. For example, the topic pages can be assortment pages or category pages that include items that capture trending purchasing intents of uses. Topic pages can be based on keywords, such as queries. For example, a topic page can be generated based on the query "shoes adidas girls," such that the topic page includes a listing of items are based on that query. Unlike a search result page, which are generated typically in real-time in response to search queries from users and which are not crawled by third-party search engines, topic pages can be pre-generated and stored to allowed third-party search engines to crawl the topic pages. The third-party search engines can be Google, Bing, Yahoo, or another suitable third-party search engine. When the topic pages have been crawled by third-party search engines, these topic pages can be listed as results of search queries to the third-party search engines, which can drive additional traffic to the website of the ecommerce retailer.

A website for an e-commerce retailer often includes browse pages. These browse pages can be pages that list items according to the categorical taxonomy of the products. For example, a browse shelf of "Outdoor Griddle Tools &

Accessories," which can have a primary category path within the product taxonomy of "Patio & Garden/Grills & Outdoor Cooking/Outdoor Cooking Tools & Accessories/ Outdoor Griddle Tools & Accessories." The browse page for the browse shelf "Outdoor Griddle Tools & Accessories" can list items that are categorized into that particular category of the product taxonomy. Many browse pages for browse shelves can exist. For example, in some examples, there can be 40,000 different browse shelf pages on the website.

Figure 5:
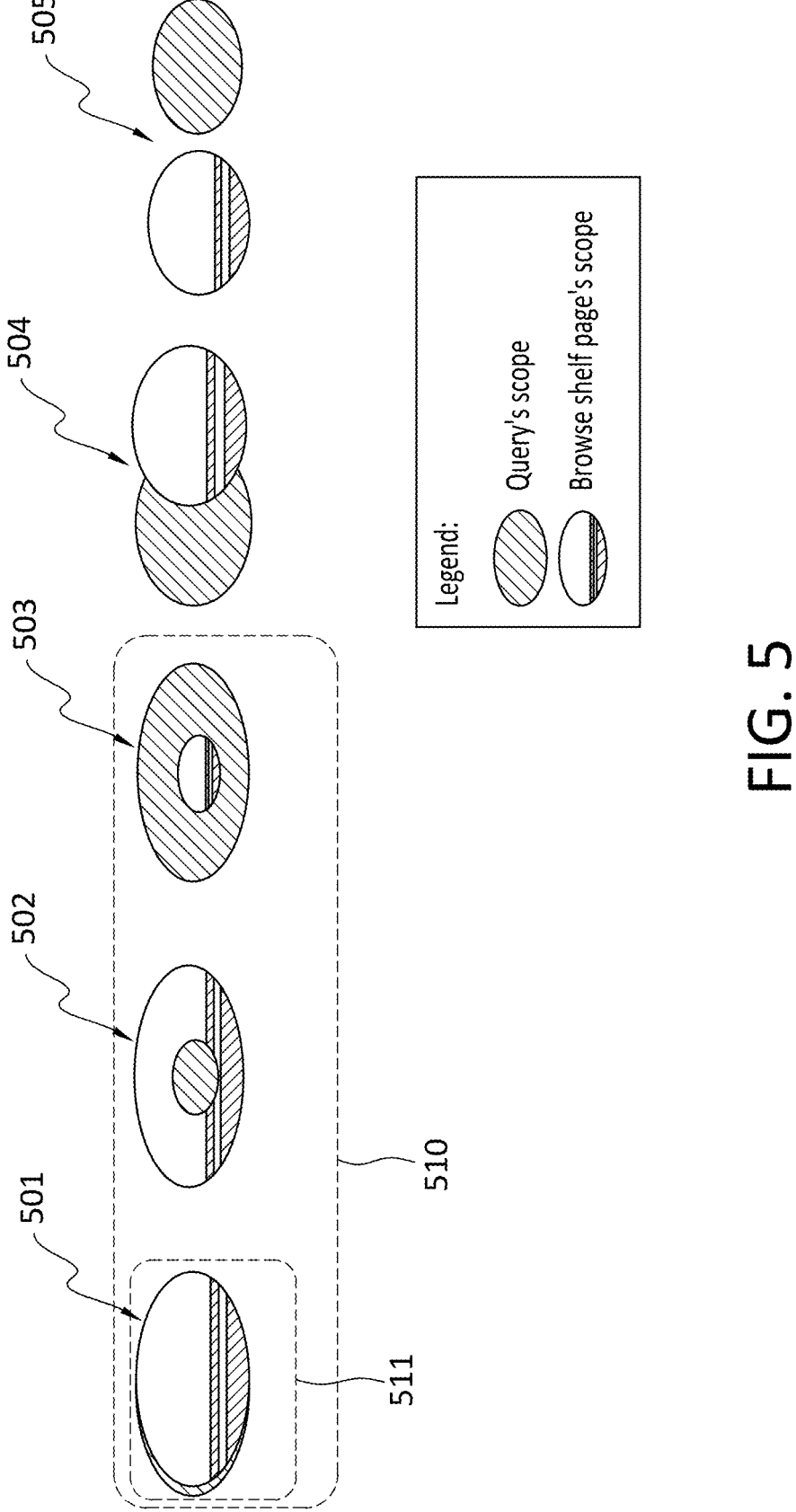
FIG. 5 illustrates various different scenarios showing differences in scope between topic pages based on keyword queries and browse shelf pages.

Generating new topic pages based on keyword queries can result in topic pages that overlap with browse pages. Jumping ahead in the drawings, FIG. 5 illustrates various different scenarios 501-505 showing differences in scope between topic pages based on keyword queries and browse shelf pages. Scenario 501 represents cases in which the scope of the keyword query is almost the same as the scope of the browse shelf page. For example, scenario 501 can apply when the keyword query is "nike shoes for kids" and the browse shelf page is for "kids' nike shoes." Most of the items on the two pages would be the same.

Scenario 502 represents cases in which the scope of the keyword query is within (i.e. a subset of) the scope of the browse shelf page. For example, scenario 502 can apply when the keyword query is "red nike shoes for girls" and the browse shelf page is for "kids' nike shoes." The items on the topic page would generally be included on the browse shelf page, but the browse shelf page would include other items that are not included on the topic page.

Scenario 503 represents cases in which the scope of the browse shelf page is within (i.e. a subset of) the scope of the keyword query. For example, scenario 503 can apply when the keyword query is "nike shoes" and the browse shelf page is for "kids' nike shoes." The items on the browse shelf page would generally be included on the topic page, but the topic page would include other items that are not included on the browse shelf page.

Scenario 504 represents cases in which the scope of the keyword query overlaps somewhat with the scope of the browse shelf page. For example, scenario 504 can apply when the keyword query is "girls' shoe" and the browse shelf page is for "kids' nike shoes." Some of the items on the browse shelf page would also be included on the topic page, but the topic page would include other items that are not included in the browse shelf page, and the browse shelf page also would include other items that are not included in the topic page.

Scenario 505 represents cases in which the scope of the keyword query is far from the scope of the browse shelf page. For example, scenario 505 can apply when the keyword query is "chocolate milk" and the browse shelf page is for "kids' nike shoes." There is generally no overlap between the items on the two pages.

It can be beneficial to generate the topic pages in scenarios 502-505, as there is a different scope of coverage, but it can be beneficial to not generate the topic page in scenario 501, as the topic page would be nearly a duplicate of the browse page. Conventional models for keyword classification are sensitive to differences in scenarios 504 and 505, but are generally not sensitive to differences between the scenarios in group 510, which includes scenarios 501-503, as keyword classification is generally not sensitive to differences in semantic scope. Semantic scope can refer to the specificity of a keyword or category. For example, "shoes" has a larger scope than "red nike shoes." In many embodiments, system 300 (FIG. 3) can capture differences within group 510, in order to distinguish scenario 501 its own group 511 as different from the rest of group 510. System 300 (FIG. 3) can deduplicate keywords that fall within group 511, such that topic pages are not generated for those keywords, while keeping the keywords in scenarios 502-505 to generate topic pages for those keywords. In many embodiments, system 300 (FIG. 3) can build text semantic similarity analysis models to perform keyword (or query) deduplication, which can effectively locate similar existing browse shelf pages given a keyword.

Turning back in the drawings, FIG. 4 illustrates a flow chart for a method 400 of providing deduplication of query to assortment pages, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), page generation deduplication system 310 (FIG. 3), and/or web server 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

In some embodiments, method 400 and other activities in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include an activity 405 of generating, using a semantic embedding generation machine learning model, one or more respective shelf embedding vector representations for each of one or more browse shelves based on a respective shelf name for the each of the one or more browse shelves. The semantic embedding generation machine learning model can be similar or identical to semantic embedding generation machine learning model 720 (FIG. 7, described below), which can be a portion of query classification machine learning model 620 (FIG. 6, described below).

Figure 6:
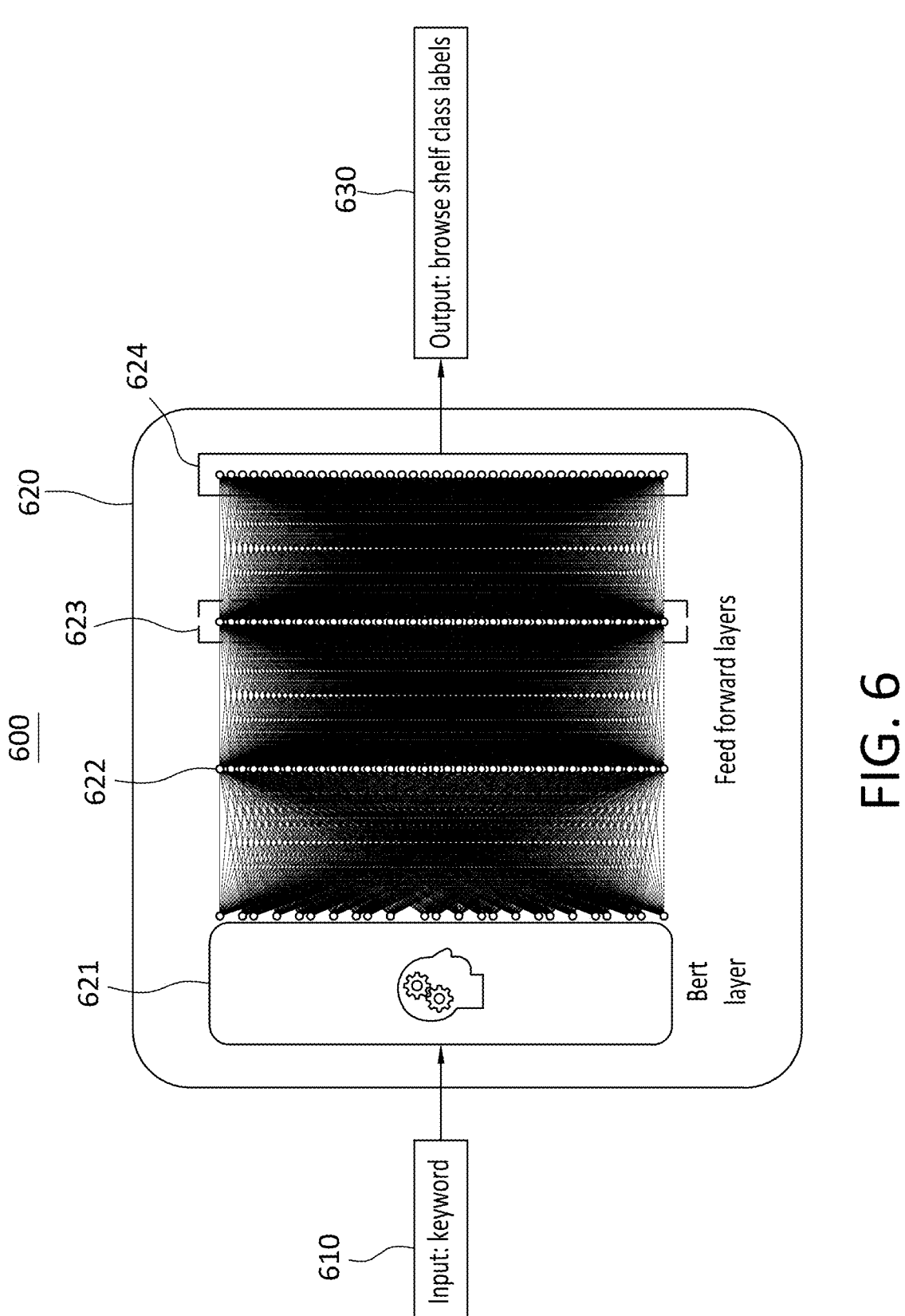
FIG. 6 shows a flow chart of a method of using a query classification machine learning model, according to an embodiment.

Turning ahead in the drawings, FIG. 6 shows a flow chart of a method 600 of using a query classification machine learning model 620. Method 600 is merely exemplary and not limited to the embodiments presented herein. Method 600 can be employed in many different embodiments or examples not specifically depicted or described herein. Method 600 can include inputting an input 610, such as a keyword, into query classification machine learning model 620, which can generate an output 630, such as browse shelf classification labels.

In some embodiments, query classification machine learning model 620 can include a BERT (Bidirectional Encoder Representations from Transformers) layer 621, a first feed forward layer 622, a second feed forward layer 623, and a third feed forward layer 624. In many embodiments, the BERT layer can output a vector output based on a neural network-based technique for natural language processing to understand the intent of the keyword. In some embodiments, the output of the BERT layer can be a 786-dimension vector, or another suitable dimension. First feed forward layer 622 can output a 2048-dimension vector, or another suitable dimension. Second feed forward layer 623 can a 3072-dimension output vector, or another suitable dimension. For example, the dimension of second feed forward layer 623 can be 128 dimensions to more than 3072 dimensions. Third feed forward layer 624 can output a 40,000-dimension vector, or another suitable dimension, which can provide sigmoid functions for calculating the multilabel probabilities for 40,000 browse shelves. Each element of the 40,000-dimension vector can be on a 0-1 scale representing the confidence of the keyword to each of the 40,000 browse shelves. As explained above, a keyword can be categorized to multiple browse shelves and can have a high confidence score in subset and/or superset scenarios (e.g., scenarios 502-503).

In many embodiments, the semantic embedding generation machine learning model can be a portion of query classification machine learning model 620, as query classification machine learning model 620 can include third feed forward layer 624 configured to output a plurality of sigmoid functions for calculating multilabel probabilities across the one or more browse shelves. Instead the semantic embedding generation machine learning model can be similar or identical to a semantic embedding generation machine learning model 720, as described in FIG. 7. The semantic embedding generation machine learning model can distinguish between scenarios 501-503 (FIG. 5).

Figure 7:
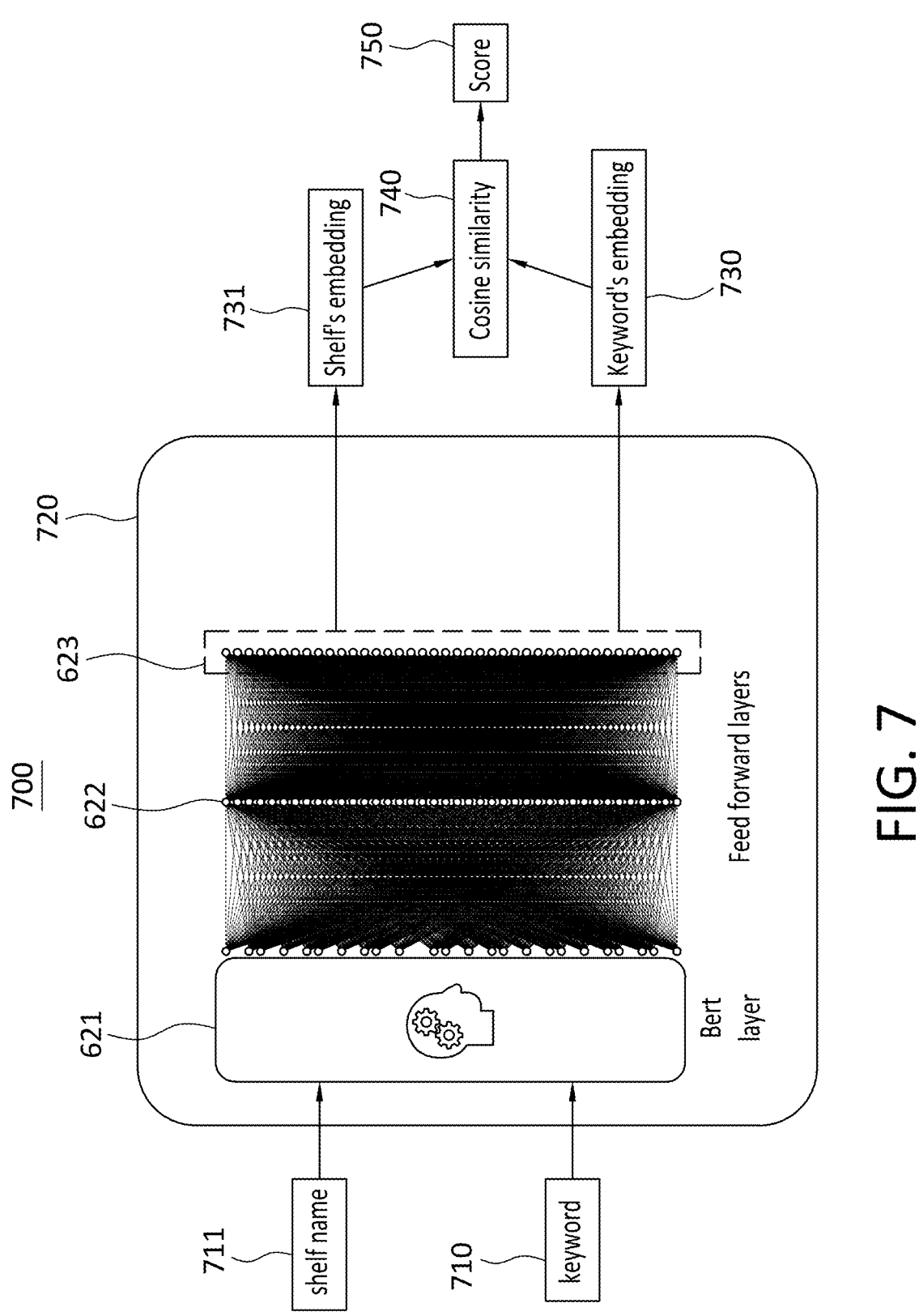
FIG. 7 illustrates a flow chart of a method of using semantic embedding generation machine learning model, according to an embodiment.

Turning ahead in the drawings, FIG. 7 illustrates a flow chart of a method 700 of using semantic embedding generation machine learning model 720. Method 700 is merely exemplary and not limited to the embodiments presented herein. Method 700 can be employed in many different embodiments or examples not specifically depicted or described herein. Method 700 can include inputting a keyword 710, into semantic embedding generation machine learning model 720, which can generate an output of a keyword embedding 730 that corresponds to keyword 710. In another example, method 700 can include inputting a shelf name 711 into semantic embedding generation machine learning model 720, which can generate an output of a shelf embedding 731 that corresponds to shelf name 711

In some embodiments, semantic embedding generation machine learning model 720 can include BERT (Bidirectional Encoder Representations from Transformers) layer 621, first feed forward layer 622, and second feed forward layer 623, but not include or not use third feed forward layer 624 (FIG. 6). The output of second feed forward layer 623 (e.g., keyword embedding 730 or shelf embedding 731) can be a learned embedding vector representation corresponding to the input (e.g., keyword 710 or shelf name 711).

Returning to FIG. 4, in a number of embodiments, activity 405 can include an activity 410 of generating a first respective shelf embedding vector representation of the one or more respective shelf embedding vector representations based on a first respective input to the semantic embedding generation machine learning model for the each of the one or more browse shelves. In some embodiments, the first respective input can be the respective shelf name for the each of the one or more browse shelves. For example, the shelf name "Therapy Hand Exercisers" for a browse shelf can be input into the semantic embedding generation machine learning model (e.g., 720 (FIG. 7)) to generate a shelf embedding vector representation for that shelf name. Similarly, the shelf names for other browse shelves can be input into the semantic embedding generation machine learning model (e.g., 720 (FIG. 7)) to generate a shelf embedding vector representation for each of those shelf names.

In some embodiments, additional inputs can be used for each of the browse shelves to generate additional shelf embedding vector representations that represent those browse shelves to more fully capture the intent, scope, and/or coverage of each of those browse shelves. The shelf name can thus be augmented with additional shelf representations to generate multiple embeddings for each browse shelf. In many embodiments, these augmented shelf representations can be concise, specific, and/or semantically understandable. Additional such inputs are described below in connection with activities 415 and 420.

In several embodiments, activity 405 also can include an activity 415 of generating a second respective shelf embedding vector representation of the one or more respective shelf embedding vector representations based on a second respective input to the semantic embedding generation machine learning model for the each of the one or more browse shelves. In some embodiments, the second respective input can include a first taxonomy level of a respective primary category path of the respective shelf name for the each of the one or more browse shelves prepended to the respective shelf name for the each of the one or more browse shelves. For example, the primary category path for the browse shelf having the shelf name "Therapy Hand Exercisers" can be "Health/Home Health Care/Physical Therapy/ Hand Exercisers/Therapy Hand Exercisers." The first level of the taxonomy is "Health," which can be prepended to the shelf name "Therapy Hand Exercisers," so the second input can be "Health Therapy Hand Exercisers." For example, "Health Therapy Hand Exercisers" can be input into semantic embedding generation machine learning model 720 to generate a shelf embedding vector representation.

In a number of embodiments, activity 405 additionally can include an activity 420 of generating a third respective shelf embedding vector representation of the one or more respective shelf embedding vector representations based on a third respective input to the semantic embedding generation machine learning model for the each of the one or more browse shelves. In some embodiments, the third respective input can include a shortened version of the respective primary category path of the respective shelf name for the each of the one or more browse shelves. In various embodiments, the shortened version of the respective primary category path of the respective shelf name for the each of the one or more browse shelves can be generated based on the respective primary category path of the respective shelf name for the each of the one or more browse shelves using suffix mapping and keyword filtering.

In some embodiments, suffix mapping can remove words that are duplicate in the primary category path by removing words in a higher level that are also found in a lower level. For example, for the primary category path "Health/Home Health Care/Physical Therapy/Hand Exercisers/Therapy Hand Exercisers," the term "Health" in the first (highest) taxonomy level is also found in the second taxonomy level, so it is removed from the first taxonomy level. Similarly, the term "Hand Exercisers" is found in both the fourth and fifth levels, so it is removed from the fourth level. The third input thus can be "Home Health Care Physical Therapy Therapy Hand Exercisers." For example, "Home Health Care Physical Therapy Therapy Hand Exercisers" can be input into semantic embedding generation machine learning model 720 to generate a shelf embedding vector representation.

In various embodiments, keyword filtering can remove terms from the primary category path that do not contain information about purchasing intent. For example, for a browse shelf with the primary category path "Electronics/ Computers/Laptops/Shop Laptops By Brand/Alienware Laptops/All Alienware Laptops," the terms "Shop," "By Brand" and "All" can be filtered out. And with additional suffix mapping, the third input can be "Electronics Computers Alienware Laptops." For example, "Electronics Computers Alienware Laptops" can be input into semantic embedding generation machine learning model 720 to generate a shelf embedding vector representation.

In some embodiments, after the BERT layer (e.g., 621 (FIGS. 6-7)) has been trained, the BERT layer can be fine-tuned using back-propagated training with augmented training data comprising augmented shelf representations for the one or more browse shelves. The original training data can be true pairs of query and shelf labels. The augmented training data can additionally include pairs of shelf representations and shelf labels, where the shelf representations are the additional representations for the shelf, such as the second input and third input described above. Blended weights can be considered for the shelf representations. Training the output against the true shelf labels can use back-propagated training to fine-tune the BERT layer and feed forward layers.

In several embodiments, method 400 also can include an activity 425 of obtaining a keyword. For example, the keyword can be a keyword that is being considered for generating a topic page, but can be tested to see if any of the existing browse shelf pages already existing would closely match the scope of the topic page. The keyword can be the same as the query that would be used to generate the topic page. In many embodiments, the one or more respective shelf embedding vector representations for the each of the one or more browse shelves can be pre-generated before obtaining the keyword.

In a number of embodiments, method 400 additionally can include an activity 430 of generating, using the semantic embedding generation machine learning model, a keyword embedding vector representation based on the keyword. For example, as shown in FIG. 7, keyword 710 can be input into semantic embedding generation machine learning model 720 to generate keyword embedding 730.

Returning to FIG. 4, in several embodiments, method 400 further can include an activity 435 of determining a respective similarity score between the keyword embedding vector representation and each of the one or more respective shelf embedding vector representations for each of the one or more browse shelves. In many embodiments, activity 435 can include using a cosine similarity measure to generate the respective similarity score. For example, as shown in FIG. 7, keyword embedding 730 and shelf embedding 731 can be input into cosine similarity function 740 to generate similarity score 750. Similarly, augmented shelf representations for a browse shelf, as described above, can be used to generate additional shelf embeddings (e.g., 731), which each can be input along with keyword embedding 730 to generate additional similarity scores for the browse shelf. These similarity scores can be generated across the browse shelves (e.g., 40,000 browse shelves), to see if any of the browse shelves are very close in scope to the keyword.

In a number of embodiments, method 400 additionally can include an activity 440 of determining whether any of the respective similarity scores for the one or more respective shelf embedding vector representations across the one or more browse shelves exceed a predetermined threshold value. In some embodiments, the predetermined threshold value can be approximately 0.88 or another suitable threshold value. For example, for a keyword "Tools for Outdoor Griddle," activity can determine that shelf embedding vector representations for two of the browse shelves exceed the threshold value of 0.88, namely the "Outdoor Griddle Tools & Accessories" browse shelf, and the "Blackstone Tools & Accessories" browse shelf. By contrast, for a keyword "alexa smart home," it can be determined that none of the shelf embedding vector representations for any existing browse pages exceed the threshold.

In several embodiments, when any of the respective similarity scores for the one or more respective shelf embedding vector representations across the one or more browse shelves exceeds a predetermined threshold value, method 400 can include an activity 445 of filtering out the keyword. The keyword "Tools for Outdoor Griddle" can be filtered out for the example provided above, such that this keyword can be "deduplicated," so that a topic page for this keyword is not generated.

In a number of embodiments, when none of the respective similarity scores for the one or more respective shelf embedding vector representations across the one or more browse shelves exceed a predetermined threshold value, method 400 can include an activity 445 of generating a new topic page using the keyword. In many embodiments, the new topic page can include an assortment page that is able to be crawled by a search engine. For example, the keyword can be used as a query in a search engine on the web site hosted by web server 320 (FIG. 3) to generate a topic page for that keyword, and the topic page can be stored and indexed to be crawled by third-party search engines.

In many embodiments, activities 425-450 can be repeated for each keyword of a list of keywords. In some embodiments, the browse shelves utilized above can include existing browse shelf pages, existing topic pages, existing branded browse pages, existing assortment pages. For topic pages and/or branded browse pages (e.g., "Nike girls' shoes"), the page titles for these pages can be in place of the shelf name.

Returning to FIG. 3, in several embodiments, communication system 311 can at least partially perform activity 425 (FIG. 4) of obtaining a keyword.

In several embodiments, machine learning system 312 can at least partially perform activity 405 (FIG. 4) of generating, using a semantic embedding generation machine learning model, one or more respective shelf embedding vector representations for each of one or more browse shelves based on a respective shelf name for the each of the one or more browse shelves, activity 410 (FIG. 4) of generating a first respective shelf embedding vector representation of the one or more respective shelf embedding vector representations based on a first respective input to the semantic embedding generation machine learning model for the each of the one or more browse shelves, activity 415 (FIG. 4) of generating a second respective shelf embedding vector representation of the one or more respective shelf embedding vector representations based on a second respective input to the semantic embedding generation machine learning model for the each of the one or more browse shelves, activity 420 (FIG. 4) of generating a third respective shelf embedding vector representation of the one or more respective shelf embedding vector representations based on a third respective input to the semantic embedding generation machine learning model for the each of the one or more browse shelves, and/or activity 430 (FIG. 4) of generating, using the semantic embedding generation machine learning model, a keyword embedding vector representation based on the keyword.

In a number of embodiments, scoring system 313 can at least partially perform activity 435 (FIG. 4) of determining a respective similarity score between the keyword embedding vector representation and each of the one or more respective shelf embedding vector representations for each of the one or more browse shelves, activity 440 (FIG. 4) of determining whether any of the respective similarity scores for the one or more respective shelf embedding vector representations across the one or more browse shelves exceed a predetermined threshold value, and/or activity 445 (FIG. 4) of filtering out the keyword.

In several embodiments, page generation system 314 can at least partially perform activity 445 (FIG. 4) of generating a new topic page using the keyword. In many embodiments, the new topic page can include an assortment page that is able to be crawled by a search engine.

In many embodiments, the techniques described herein can provide a practical application and several technological improvements. In some embodiments, the techniques described herein can provide for deduplication of query to assortment pages. The techniques described herein can provide a significant improvement over conventional approaches that fail to account for the semantic scope of keyword queries. In many embodiments, the techniques described herein can support multiple different page types, such as topic pages, browse shelf pages, branded browse pages, or other suitable page types. In several embodiments, the techniques described herein can support multi-page and/or single-page semantic similarity mapping. In some embodiments, the techniques described herein can support automatic filtering with a similarity threshold that can be predetermine and/or configurable. In several embodiments, the techniques described herein can support similarity analysis for arbitrary keyword pairs.

In a number of embodiments, the techniques described herein can solve a technical problem that arises only within the realm of computer networks, as online ordering is a concept that do not exist outside the realm of computer networks. Moreover, the techniques described herein can solve a technical problem that cannot be solved outside the context of computer networks. Specifically, the techniques described herein cannot be used outside the context of computer networks, in view of a lack of data, the lack of browse shelf pages, topic pages, and search pages outside computer networks, and the inability to train the machine-learning recommendation models without a computer.

Various embodiments can include a system including one or more processors and one or more non-transitory computer-readable media storing computing instructions that, when executed on the one or more processors, cause the one or more processor to perform certain acts. The acts can include generating, using a semantic embedding generation machine learning model, one or more respective shelf embedding vector representations for each of one or more browse shelves based on a respective shelf name for the each of the one or more browse shelves. The acts also can include obtaining a keyword. The acts additionally can include generating, using the semantic embedding generation machine learning model, a keyword embedding vector representation based on the keyword. The acts further can include determining a respective similarity score between the keyword embedding vector representation and each of the one or more respective shelf embedding vector representations for each of the one or more browse shelves. The acts additionally can include determining whether any of the respective similarity scores for the one or more respective shelf embedding vector representations across the one or more browse shelves exceed a predetermined threshold value. When any of the respective similarity scores for the one or more respective shelf embedding vector representations across the one or more browse shelves exceeds a predetermined threshold value, the acts further can include filtering out the keyword. When none of the respective similarity scores for the one or more respective shelf embedding vector representations across the one or more browse shelves exceed a predetermined threshold value, the acts additionally can include generating a new topic page using the keyword.

A number of embodiments can include a method being implemented via execution of computing instructions configured to run at one or more processors. The method can include generating, using a semantic embedding generation machine learning model, one or more respective shelf embedding vector representations for each of one or more browse shelves based on a respective shelf name for the each of the one or more browse shelves. The method also can include obtaining a keyword. The method additionally can include generating, using the semantic embedding generation machine learning model, a keyword embedding vector representation based on the keyword. The method further can include determining a respective similarity score between the keyword embedding vector representation and each of the one or more respective shelf embedding vector representations for each of the one or more browse shelves. The method additionally can include determining whether any of the respective similarity scores for the one or more respective shelf embedding vector representations across the one or more browse shelves exceed a predetermined threshold value. When any of the respective similarity scores for the one or more respective shelf embedding vector representations across the one or more browse shelves exceeds a predetermined threshold value, the method further can include filtering out the keyword. When none of the respective similarity scores for the one or more respective shelf embedding vector representations across the one or more browse shelves exceed a predetermined threshold value, the method additionally can include generating a new topic page using the keyword.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although deduplication of query to assortment pages has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions that, when executed on the one or more processors, cause the one or more processors to perform:

generating, using a semantic embedding generation machine learning model, shelf embedding vector representations for browse shelves based on shelf names for the browse shelves, wherein a browse page, on a website and for a browse shelf of the browse shelves, lists items that are categorized into a particular category that corresponds to a shelf name of the shelf names and a primary category path within a product taxonomy;

obtaining a keyword;

generating, using the semantic embedding generation machine learning model, a keyword embedding vector representation based on the keyword;

determining a similarity score, indicating closeness of scope of the browse shelf to the keyword, based on the keyword embedding vector representation and a shelf embedding vector representation, of the shelf embedding vector representations, for the browse shelf;

determining that the similarity score, indicating closeness of scope of the browse shelf to the keyword, exceeds a threshold value; and generating one or more new topic pages that overlap in scope with the browse page, are configured to be crawled by third-party search engines, and list items capturing trending intents without generating a new topic page that is nearly a duplicate of the browse page based on determining that the similarity score, indicating closeness of scope of the browse shelf to the keyword, exceeds the threshold value.

2. The system of claim 1, wherein the semantic embedding generation machine learning model comprises:

a Bidirectional Encoder Representations from Transformers (BERT) layer;

a first feed forward layer; and a second feed forward layer.

3. The system of claim 2, wherein:

the semantic embedding generation machine learning model is a portion of a query classification machine learning model comprising a third feed forward layer configured to output a plurality of sigmoid functions for calculating multilabel probabilities across the browse shelves; and after the BERT layer has been trained, the BERT layer is fine-tuned using back-propagated training with augmented training data comprising augmented shelf representations for the browse shelves.

4. The system of claim 1, wherein the similarity score, indicating closeness of scope of the browse shelf to the keyword, comprises is based on a cosine similarity measure.

5. The system of claim 1, wherein the threshold value is approximately 0.88.

6. The system of claim 1, wherein generating the shelf embedding vector representations comprises:

generating a first respective shelf embedding vector representation of the shelf embedding vector representations based on a first respective input to the semantic embedding generation machine learning model;

generating a second respective shelf embedding vector representation of the shelf embedding vector representations based on a second respective input to the semantic embedding generation machine learning model; and generating a third respective shelf embedding vector representation of the shelf embedding vector representations based on a third respective input to the semantic embedding generation machine learning model, wherein the shelf embedding vector representation is the first respective shelf embedding vector representation, the second respective shelf embedding vector representation, or the third respective shelf embedding vector representation.

7. The system of claim 6, wherein:

the first respective input comprises the shelf name;

the second respective input comprises a first taxonomy level of the primary category path; and the third respective input comprises a shortened version of the primary category path.

8. The system of claim 7, wherein:

the shortened version of the primary category path is generated using suffix mapping and keyword filtering.

9. The system of claim 1, wherein the shelf embedding vector representations are pre-generated before obtaining the keyword.

10. The system of claim 1, wherein the one or more new topic pages include an assortment page that is able to be crawled by a search engine.

11. A method implemented via execution of computing instructions configured to run at one or more processors, the method comprising:

generating, using a semantic embedding generation machine learning model, one or more respective shelf embedding vector representations for each of one or more browse shelves based on a respective shelf name, wherein one or more browse pages, on a web site and for the one or more browse shelves, include a browse page that lists items that are categorized into a particular category;

obtaining a keyword;

generating, using the semantic embedding generation machine learning model, a keyword embedding vector representation based on the keyword;

determining a respective similarity score between the keyword embedding vector representation and each of the one or more respective shelf embedding vector representations;

determining that a threshold value is satisfied by a similarity score, of the respective similarity scores, indicating closeness of scope of a browse shelf, of the one or more browse shelves, to the keyword; and generating one or more new topic pages that overlap in scope with the browse page and list items that capture trending intents without generating a new topic page that is nearly a duplicate of the browse page based on determining that the threshold value is satisfied by the similarity score that indicates closeness of scope of the browse shelf to the keyword.

12. The method of claim 11, wherein the semantic embedding generation machine learning model comprises:

a Bidirectional Encoder Representations from Transformers (BERT) layer;

a first feed forward layer; and a second feed forward layer.

13. The method of claim 12, wherein:

the semantic embedding generation machine learning model is a portion of a query classification machine learning model further comprising a third feed forward layer configured to output a plurality of sigmoid functions for calculating multilabel probabilities across the one or more browse shelves; and after the BERT layer has been trained, the BERT layer is fine-tuned using back-propagated training with augmented training data comprising augmented shelf representations for the one or more browse shelves.

14. The method of claim 11, wherein determining the respective similarity score comprises:

using a cosine similarity measure to generate the respective similarity score.

15. The method of claim 11, wherein the threshold value is approximately 0.88.

16. The method of claim 11, wherein generating the one or more respective shelf embedding vector representations based on:

a first respective input to the semantic embedding generation machine learning model, a second respective input to the semantic embedding generation machine learning model, and a third respective input to the semantic embedding generation machine learning model.

17. The method of claim 16, wherein:

the first respective input comprises the respective shelf name, the second respective input comprises a first taxonomy level of a respective primary category path of the respective shelf name, and the third respective input comprises a shortened version of the respective primary category path of the respective shelf name.

18. The method of claim 17, wherein:

the shortened version of the respective primary category path of the respective shelf name is generated using suffix mapping and keyword filtering.

19. The method of claim 11, wherein the one or more respective shelf embedding vector representations are pre-generated before obtaining the keyword.

20. A non-transitory, computer-readable medium comprising instructions that, when executed by a processing resource, causes the processing resource to:

generate, using a semantic embedding generation machine learning model, a shelf embedding vector representation for a browse shelf based on a shelf name for the browse shelf, wherein a browse page, on a website and for the browse shelf, lists items that are categorized into a particular category that corresponds to the shelf name;

generate, using the semantic embedding generation machine learning model, a keyword embedding vector representation based on a keyword;

determine a similarity score, indicating closeness of scope of the browse shelf to the keyword, based on the keyword embedding vector representation and the shelf embedding vector representation;

determine that the similarity score, indicating closeness of scope of the browse shelf to the keyword, exceeds a threshold value; and generate one or more new topic pages that overlap in scope with the browse page and list items that capture trending intents without generating a new topic page that is nearly a duplicate of the browse page based on determining that the similarity score, indicating closeness of scope of the browse shelf to the keyword, exceeds the threshold value.

* * * * *